United States Patent

[11] 3,600,068

[72] Inventors Charles R. Jolicoeur, Jr.
Rte. 1 Nugent Ave., Addison, Ill. 60101;
James R. Dempsey, 1433 S. Mohawk,
Roselle, Ill. 60172
[21] Appl. No. 815,823
[22] Filed Apr. 14, 1969
[45] Patented Aug. 17, 1971

[54] SPRING ATTACHMENT FOR EYEGLASS FRAMES
2 Claims, 6 Drawing Figs.
[52] U.S. Cl. .................................................. 351/113,
267/154
[51] Int. Cl. ............................................... G02c 5/16,
F16f 1/10
[50] Field of Search ............................................ 351/113,
118; 16/128; 287/92; 267/154, 155

[56] References Cited
UNITED STATES PATENTS
2,367,418  1/1945  Morrell ...................... 351/113 UX
1,502,578  7/1924  Leisenring .................. 267/155

Primary Examiner—David Schonberg
Assistant Examiner—Robert L. Sherman
Attorney—Greist, Lockwood, Greenawalt & Dewey ABSTRACT: A spring attachment for the hinge ends of the temples of eyeglass frames which serve to urge the temples toward the folded position when the eyeglasses are in use so as to apply sufficient pressure against the head of the wearer to prevent movement of the eyeglasses out of proper position when the wearer moves his head out of normal upright position in leaning over or the like.

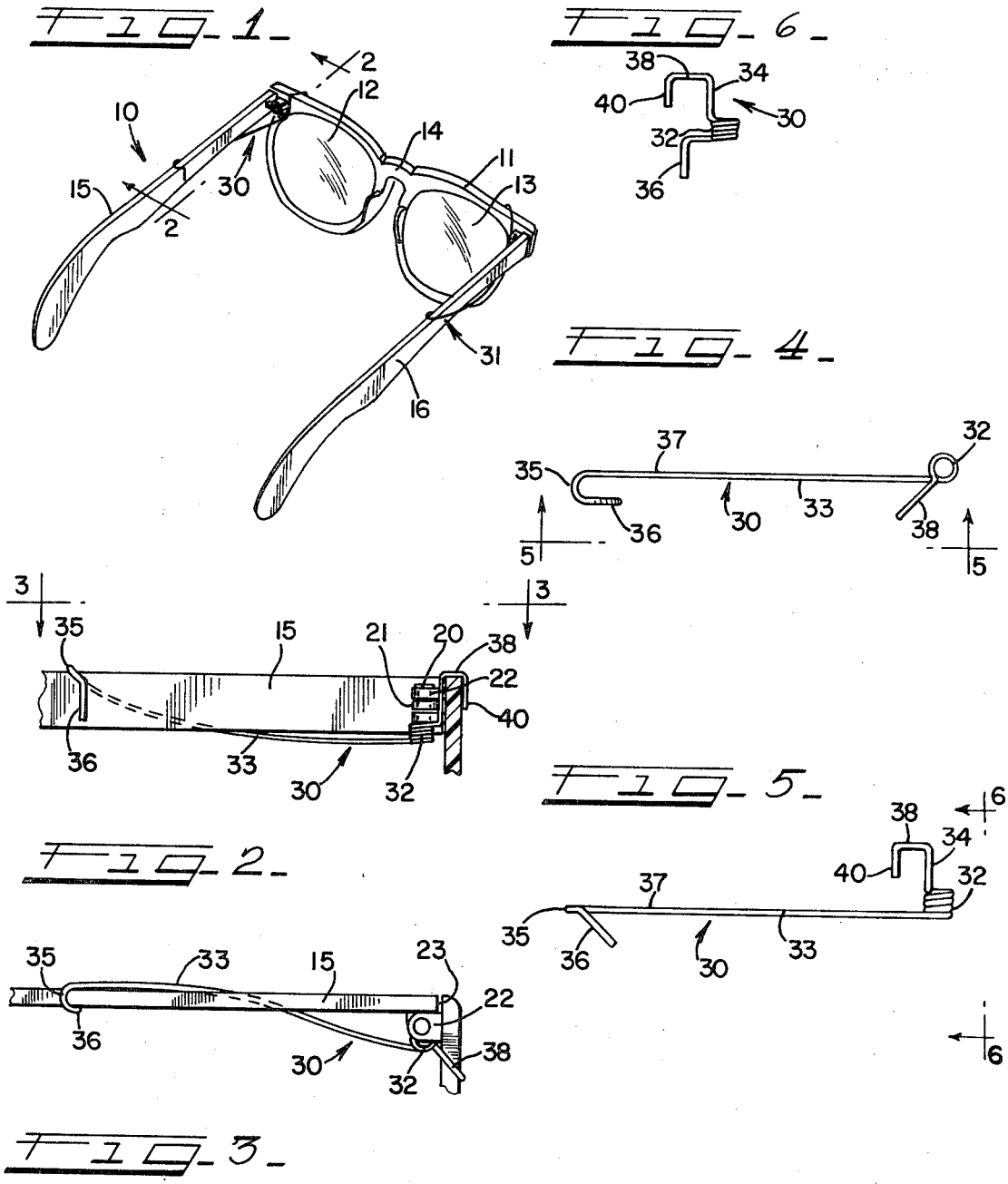

SPRING ATTACHMENT FOR EYEGLASS FRAMES

This invention relates to eyeglass constructions and is more particularly concerned with improvements in eyeglass frame structures.

It is a conventional practice in fabricating eyeglass frames to hinge the temples to the lens-receiving section of the frame so that they may be folded flat upon the back face of the lens section when not in use and stored in a case or the like. When it is desired to use the eyeglasses the temples may be swung to an open position where they are spread apart sufficient for the lenses to be placed in proper position for use on the head of the wearer. Generally, the frames are formed of a metal or plastic material, or a combination thereof, which permits of some adjustments permitting the frame to be fitted to the head of the wearer for comfortable use with the temples spaced generally so as to apply very little, if any, pressure on the head. In normal use, with the head in upright position, this is sufficient to hold the eyeglasses in proper position for correct vision. However, after a period of use the temples frequently become spread apart by wear or they are sprung to an extent that they no longer exercise sufficient grip on the head to hold the frame in proper placement but permit the weight of the frame to drag the same down on the nose where the lenses are not properly spaced or located relative to the eyes. Also, in performing some tasks, the wearer may be required to lean over or lower his head so that the frame tends to drop off or slide down out of position, particularly when the areas which the temples engage become wet due to perspiration. While some eyeglass frame structures have been suggested which include spring loading of the temple mounting no apparent effort has been made to provide a mounting which satisfactorily solves the problem of holding the eyeglass frame in proper position on the wearer's head when head movement is in a direction tending to dislodge the frame or the head is shifted to a position where due to gravitational pull on the frame, it is caused to slide out of proper position. The general object, therefore, of the present invention is to provide an improved eyeglass frame structure which will resist movement of the frame when it is in proper position for use on the head of the wearer and which will avoid, to a large degree, dislodgment of the frame when the wearer leans over or otherwise shifts his head so that the weight of the eyeglasses would normally cause the frame to fall off or slide out of proper position.

It is more specific object of the invention to provide an attachment for incorporation in an eyeglass frame structure which will spring load the mounting for the temples so that when the eyeglasses are placed on the head of the wearer, in proper position for use, the temples will be urged toward each other with sufficient force to grip the head so as to hold the frame in position and resist forces tending to dislodge the same when the head is moved out of the normal upright position.

A still more specific object of the invention is to provide an attachment for spring loading the temple mounting of eyeglass frames so as to urge the temples toward each other and hold the frame on the head when the latter is moved about and the frame is subject to forces tending to dislodge the frame, wherein the attachment is constructed so that it may be readily attached to the majority of eyeglass frame structures in which the temples are hinged to the outboard edges of lens receiving frame sections.

A further object of the invention is to provide an attachment for spring loading the temple mounting of an eyeglass frame which comprises a coiled spring section having attaching arms extending from opposite ends of the coiled section which are bent so as to hook over potions of the temple and the lens receiving frame portion and which are adapted, when connected to the temple and lens portion, to urge the temple in the direction to fold against the back of the lens portion.

These and other objects and advantages of the invention will be apparent from a consideration of the eyeglass frame construction which is shown by way of illustration in the accompanying drawings wherein:

FIG. 1 is a perspective view of an eyeglass frame having embodied therein a spring loading for the temples which incorporates the principal features of the invention;

FIG. 2 is a fragmentary section taken on the line 2—2 of FIG. 1 to an enlarged scale;

FIG. 3 is a fragmentary elevational view taken on the line 3—3 of FIG. 2 to an enlarged scale;

FIG. 4 is a top plan view of the spring loading device removed from the frame;

FIG. 5 is an elevational view of the spring loading device of FIG. 4, the view being taken on the line 5—5 of FIG. 4; and FIG. 6 is an end elevational view taken on the line 6—6 of FIG. 5.

Referring first to FIG. 1, there is illustrated an eyeglass frame structure 10 which comprises a front frame section 11 having provision for mounting thereon a pair of lenses 12 and 13 on opposite sides of a bridge piece 14. A pair of temple bars or arm members 15 and 16 are connected at their forward ends by hinge structures 17 and 18 with the outboard margins of the lens frame 11. The temple arms 15 and 16, when in the open position, are adapted to fit along the sides of the temple of the wearer and each arm has at its free end a curved or bent configuration designed to rest on the top of the ear lobe with a turned down portion designed to fit against the head at the back of the ear. The temple arms 15 and 16 are, of course, rights and lefts, but otherwise they are of identical structure. In the form of the frame shown the forward end of each of the temple bars 15 and 16 is connected to the lens frame section, as shown in FIGS. 2 and 3, by a hinge pin 20 operating in bearing lugs or tongues 21 and 22 extending in interleaved relation from the frame members. The end edge 23 of each temple bar is adapted to abut against the face of the frame section 11, with the latter forming a stop to limit the outward movement of the temple bar. The structure thus far described is typical of eyeglass frames offered commercially.

A spring member 30, as shown in FIGS. 2 and 3, which embodies the present invention, is mounted on the frame 10 at the hinge connection between the temple bar 15 and the one side or end section of the lens receiving portion 11 of the frame 10. A like spring 31, but of the opposite hand, is mounted on the frame 10 at the hinge connection with the temple bar 16 on the opposite side of the frame. Except for being rights and lefts, the spring members or devices 30 and 31 are of identical construction and only one will be described in detail.

The spring member or device 30 is illustrated in FIGS. 4, 5 and 6 in the form in which it is fabricated and prior to its mounting on or attachment to the eyeglass frame. The spring device 30 is formed of relatively light gauge spring wire with a coiled section 32 from the opposite ends of which the arms 33 and 34 extend. The longer arm 33 extends normal to the axis of the coiled section 32 and is substantially longer than the arm 34 which extends in the general direction of the axis of the coiled section 32 from a point on the periphery of the end coil. The longer arm 33 has its free end bent into a hook forming, generally C-shape, at 35, with the terminal end potion 36 bent at an acute angle to the main body portion 37 of the arm. The portion 35 of spring 30 is adapted to hook over the top edge of the temple bar 15 as shown in FIG. 2 when the spring 30 is attached to the frame 10. The shorter arm 34 has its free end portion bent as shown in FIG. 6 into a generally rectangular form. The topmost portion 38 of the end section of the arm 34 is adapted to ride on the top edge of the frame section 11 while the terminal portion 40 engages the front face of the frame section 11 as shown in FIG. 2.

In attaching the device 30 to the frame 10 the coiled section 32 is located near the base of the hinge 20. The main portion 37 of longer arm 33 extends beneath the lower edge of the temple bar 15 with the hook-shaped end 35 draped over the top edge so that the terminal portion 36 thereof lies along the inside face of the temple bar 15. The short arm 34 extends vertically along the inside face of the lens carrying section 11 with the portion 38 extending over the top edge and the terminal portion 40 engaging with the front face thereof. When the spring member 30 is in position on the frame 10 the ends thereof are free to slide along the top edges of the frame members and there is no jamming when the temple arm 15 is swung to or from the open position. The spring device 30 may be readily removed it it is desired. It is self-adjusting once it is positioned on the frame. It is constructed so that it may be attached to a variety of frames of the general type illustrated.

We claim:

1. A device for mounting in readily detachable relation on eyeglass frame structures of the type which are characterized by a lens holding section and temple members hingedly joined to opposite ends thereof, said device comprising a coiled wire tension spring member having arms extending from its opposite ends, said coiled wire tension spring member being disposed adjacent the hinge joint on the inner side of the lens holding section of said frame structure and the temple member when mounted thereon, one of said arms being at the top end of said coiled wire tension spring member and having means for detachably connecting to a top edge portion of the lens frame at a point spaced from the hinge joint connecting the temple member and the lens frame and the other one of said arms extending from the bottom end of said coiled wire tension spring member and having means for detachable connecting to a top edge portion of the temple member at a point also spaced from said hinge joint so as to normally urge the temple member to a closed position where it is folded against the lens frame, said means for detachably connecting said one spring arm to said lens frame comprising a bent over end section on said spring arm which is hooked over the top edge of said lens frame so as to slide thereon when the temple member is swung relative to said lens frame, and said coiled wire tension spring member having sufficient tension whereby when the temple member is opened to normal wearing position sufficient tension whereby when the temple member is opened to normal wearing position sufficient pressure will be exerted on the temple member to urge the temple member into snug engagement with the temple of the wearer.

2. A device as set forth in claim 1, wherein said spring member arms each have a bent over end section forming a hook configuration for engaging over the top edge of the lens frame and the top edge of the associated temple member, respectively, so as to form sliding connections with the top edge portions of the lens frame and temple member.